(12) United States Patent
Nishioka et al.

(10) Patent No.: US 8,858,383 B2
(45) Date of Patent: Oct. 14, 2014

(54) GEAR TRANSMISSION

(75) Inventors: Naoki Nishioka, Tsu (JP); Yusuke Kataoka, Tsu (JP); Satoshi Tanaka, Tsu (JP); Shigeki Asano, Tsu (JP)

(73) Assignee: Nabtesco Corporation, Tokyo (JP)

( * ) Notice: Subject to any disclaimer, the term of this patent is extended or adjusted under 35 U.S.C. 154(b) by 41 days.

(21) Appl. No.: 13/807,201

(22) PCT Filed: Jun. 21, 2011

(86) PCT No.: PCT/JP2011/064167
§ 371 (c)(1),
(2), (4) Date: Dec. 27, 2012

(87) PCT Pub. No.: WO2012/005111
PCT Pub. Date: Jan. 12, 2012

(65) Prior Publication Data
US 2013/0102433 A1    Apr. 25, 2013

(30) Foreign Application Priority Data
Jul. 8, 2010    (JP) .................................. 2010-155826

(51) Int. Cl.
*F16H 1/32*    (2006.01)
*F16H 3/70*    (2006.01)

(52) U.S. Cl.
CPC .......... *F16H 1/321* (2013.01); *F16H 2001/323* (2013.01); *F16H 1/32* (2013.01)
USPC ......................................... 475/162; 475/170

(58) Field of Classification Search
CPC ........................................................ F16H 1/46
USPC ................................................. 475/162–173
See application file for complete search history.

(56) References Cited

U.S. PATENT DOCUMENTS 4,896,567 A * 1/1990 Zhou .............................. 475/170
4,898,065 A    2/1990 Ogata et al.
(Continued)

FOREIGN PATENT DOCUMENTS

DE    2 400 590    7/1974
DE    102012021536 A1 *    5/2013 .............. F16H 37/04
(Continued)

OTHER PUBLICATIONS

Communication mailed Nov. 25, 2013 from European patent office in counterpart EP application No. 11803447.9, including European Search Opinion, Supplementary European Search Report and examined claims 1-10.
(Continued)

*Primary Examiner* — Tisha Lewis
(74) *Attorney, Agent, or Firm* — J-Tek Law PLLC; Jeffrey D. Tekanic; Scott T. Wakeman

(57) ABSTRACT

A gear transmission includes an eccentric-oscillating-type first reduction gear unit having a first internal gear, a first crankshaft with at least one first eccentric body defined thereon, a first input gear fixed to the first crankshaft and a first output member, as well as an eccentric-oscillating-type second reduction gear unit disposed coaxially with the first reduction gear unit and surrounding the first reduction gear unit. The second reduction gear unit has a second internal gear, a second crankshaft with at least one second eccentric body defined thereon, a second input gear fixed to the second crankshaft and a second output member. The first output member is engaged with the second input gear. Further, the first internal gear is disposed, in the axial direction of the gear transmission, between the second input gear and the at least one second eccentric body.

20 Claims, 7 Drawing Sheets

(56) References Cited

U.S. PATENT DOCUMENTS

| | | | |
|---|---|---|---|
| 7,553,249 B2 * | 6/2009 | Nohara | 475/170 |
| 8,152,676 B2 * | 4/2012 | Kobayashi et al. | 475/162 |
| 8,517,879 B2 * | 8/2013 | Misada et al. | 475/178 |

FOREIGN PATENT DOCUMENTS

| | | |
|---|---|---|
| EP | 0305535 A1 | 3/1989 |
| GB | 1 453 135 | 10/1976 |
| JP | S63-243547 A | 10/1988 |
| JP | S63-270946 A | 11/1988 |
| JP | H1-242850 A | 9/1989 |
| JP | H5-42277 U | 6/1993 |
| JP | 2525590 B2 | 5/1996 |
| JP | 2006-317009 A | 11/2006 |
| JP | 2007-78010 A | 3/2007 |
| JP | 2008-298294 A | 12/2008 |

OTHER PUBLICATIONS

International Search Report for parent PCT application No. PCT/JP2011/064167.

English translation of International Preliminary Report on Patentability from parent International application No. PCT/JP2011/064167.

\* cited by examiner

GEAR TRANSMISSION

CROSS-REFERENCE

This application is the U.S. national stage of International Patent Application No. PCT/JP2011/064167 filed on Jun. 21, 2011, which claims priority to Japanese Patent Application No. 2010-155826 filed on Jul. 8, 2010, the contents of which are hereby incorporated by reference into the present application.

TECHNICAL FIELD

This application generally relates to a gear transmission. For example, the application relates to a gear transmission in which two eccentric oscillating type reduction gear mechanisms (reduction gear units) are combined.

BACKGROUND ART

An eccentric oscillating type gear transmission is known. An eccentric oscillating type gear transmission can obtain a larger reduction ratio than a typical gear transmission provided with a plurality of spur gear trains. In this type of gear transmission, an external gear rotates eccentrically relative to an internal gear while meshing with the internal gear. Eccentric oscillating type gear transmissions include a type in which the external gear rotates eccentrically, and a type in which the internal gear rotates eccentrically. Below, to simplify the description, the type in which the external gear rotates eccentrically will be described. In this type of gear transmission, a crankshaft is supported on a member called a carrier. The external gear is engaged with the crankshaft. The crankshaft has an eccentric body for eccentrically rotating the external gear. The eccentric body fits with the external gear. The external gear can be said to be supported on the carrier via the crankshaft.

The internal gear is formed on the inner side of a case. When rotational torque of a motor is applied to the crankshaft, the external gear rotates eccentrically relative to the internal gear. The number of teeth of the external gear differs from the number of teeth of the internal gear. Consequently, when the external gear rotates eccentrically while meshing with the internal gear, the external gear rotates relative to the internal gear in accordance with the difference in number of teeth of the external gear and the internal gear. Since the carrier is supporting the external gear, the carrier also rotates relative to the internal gear. Consequently, the carrier rotates relative to the case. In situations where the case of the gear transmission is fixed to a base member, the carrier corresponds to an output member of the gear transmission. Since the reduction ratio in this situation is determined by the "difference in number of teeth/(number of teeth of internal gear+1)", a large reduction ratio can be obtained. Moreover, in the type of gear transmission in which the internal gear rotates eccentrically, the external gear corresponds to the output member of the gear transmission. Further, in the present specification, a large denominator of the reduction ratio (a small absolute value of the reduction ratio) is expressed as the "reduction ratio being large".

When two eccentric oscillating type gear transmissions are connected in series, a larger reduction ratio can be obtained. Examples of this type of gear transmission are disclosed in Japanese Patent Application Publication No. 2006-317009 and Japanese Patent Application Publication No. H1-242850. In the description below, Japanese Patent Application Publication No. 2006-317009 is called Patent Document 1, and Japanese Patent Application Publication No. H1-242850 is called Patent Document 2. The gear transmissions of Patent Document 1 and Patent Document 2 comprise two eccentric oscillating type gear transmissions (reduction units). An output member (carrier) of a first reduction unit of both the gear transmissions is connected with an input member (crankshaft) of a second reduction unit.

SUMMARY OF THE INVENTION

In the gear transmission of Patent Document 1, the first reduction unit and the second reduction unit are aligned in an axial direction. Consequently, the overall length of the gear transmission in the axial direction is approximately twice the length of a conventional gear transmission. That is, although the gear transmission of Patent Document 1 can obtain a large reduction ratio, the overall length of the gear transmission in the axial direction increases.

In the gear transmission of Patent Document 2, a large through-hole is formed in the center of the second reduction unit, and the first reduction unit is disposed in the through-hole of the second reduction unit. As described above, in an eccentric oscillating type reduction unit, the external gear is engaged with the eccentric body of the crankshaft, and the external gear rotates eccentrically relative to the internal gear while meshing with the internal gear. Consequently, the eccentric body, the external gear and the internal gear are disposed within one plane orthogonal to the axis of the reduction unit. The eccentric body and the external gear are disposed inside the internal gear. Consequently, the diameter of the reduction unit is determined by the diameter of the internal gear. In the gear transmission of Patent Document 2, the eccentric body, the external gear and the internal gear of the first reduction unit are disposed on the same plane as the eccentric body, the external gear and the internal gear of the second reduction unit. Consequently, in the gear transmission of Patent Document 2, the external gear of the second reduction unit has a through-hole larger than the internal gear of the first reduction unit. The eccentric body, external gear and internal gear of the second reduction unit are disposed radially outward of the through-hole. Consequently, the diameter of the second reduction unit increases. The diameter of the gear transmission that includes the first reduction unit and the second reduction unit increases. In the gear transmission of Patent Document 2, although the overall length of the gear transmission in the axial direction is shorter, the diameter of the gear transmission increases. In the conventional art, a gear transmission in which two reduction units are connected becomes longer in the axial direction or the radial direction. Moreover, the "radial direction" means the direction orthogonal to the axis of the gear transmission. "Length in the radial direction" corresponds to the diameter of the gear transmission. The present specification teaches a technique for reducing the size of a gear transmission in which two reduction units are connected.

In one aspect of the present teachings, a gear transmission comprises a first reduction unit of an eccentric oscillating type, and a second reduction unit of an eccentric oscillating type disposed coaxially with the first reduction unit. The second reduction unit is disposed so as to surround the periphery of the first reduction unit. An output member of the first reduction unit is engaged with a crankshaft of the second reduction unit. The crankshaft corresponds to an input member of the second reduction unit. An input gear is fixed to a crankshaft of the second reduction unit. Furthermore, an eccentric body is formed on the crankshaft of the second reduction unit. An internal gear of the first reduction unit is disposed between the input gear of the crankshaft and the eccentric body of the crankshaft of the second reduction unit. Moreover, "the second reduction unit is disposed so as to surround the periphery of the first reduction unit" means, more precisely, that the second reduction unit surrounds the first reduction unit in a plane orthogonal to the axis of the gear transmission. That is, as viewed from the direction of the rotational axis of the gear transmission, the second reduction unit is disposed so as to surround the periphery of the first reduction unit. There is a large hole in the center of the second reduction unit, and the first reduction unit is disposed in that hole.

In the aforementioned gear transmission, the internal gear of the first reduction unit is disposed inside the second reduction unit. It is no longer necessary to align the first reduction unit and the second reduction unit in the axial direction, and the overall length of the gear transmission in the axial direction can be made shorter than the sum of the length of the first reduction unit in the axial direction and the length of the second reduction unit in the axial direction. Further, in the gear transmission, the internal gear of the first reduction unit is disposed between the input gear of the crankshaft and the eccentric body of the crankshaft of the second reduction unit. In other words, the location of the eccentric body, the external gear and the internal gear of the first reduction unit is offset, in the axial direction, from the location of the eccentric body, the external gear and the internal gear of the second reduction unit. The through-hole of the external gear of the second reduction unit does not need to be made larger than the diameter of the internal gear of the first reduction unit. In the aforementioned gear transmission, even though the two reduction units are connected, the length in the axial direction can be reduced and the diameter can be reduced.

In the aforementioned gear transmission, the first reduction unit may be the type in which the external gear rotates eccentrically or the type in which the internal gear rotates eccentrically. In a case of the type in which the external gear rotates eccentrically, the carrier corresponds to the output member of the first reduction unit. The carrier of the first reduction unit engages with the crankshaft of the second reduction unit. In a case of the type in which the internal gear rotates eccentrically, the external gear corresponds to the output member of the first reduction unit. The external gear of the first reduction unit engages with the crankshaft of the second reduction unit.

Both the first reduction unit and the second reduction unit may be the type in which the external gear rotates eccentrically. In this case, each of the first reduction unit and the second reduction unit comprises a carrier, a crankshaft, an internal gear, and an external gear. In the description below, each of the internal gear, the external gear, the carrier and the crankshaft of the first reduction unit may be called a first internal gear, first external gear, first carrier and first crankshaft. Each of the internal gear, the external gear, the carrier and the crankshaft of the second reduction unit may be called a second internal gear, second external gear, second carrier and second crankshaft. Further, the eccentric body of the first crankshaft may be called a first eccentric body, and the eccentric body of the second crankshaft may be called a second eccentric body. In case an input gear is fixed to both the first crankshaft and the second crankshaft, the input gear fixed to the first crankshaft may be called a first input gear, and the input gear fixed to the second crankshaft may be called a second input gear.

In case both the first reduction unit and the second reduction unit are the type in which the external gear rotates eccentrically, the first reduction unit comprises a first carrier, a first crankshaft, a first external gear, and a first internal gear, and the second reduction unit comprises a second carrier, a second crankshaft, a second external gear, and a second internal gear. In a case of this type of gear transmission, the first carrier corresponds to the output member of the first reduction unit. The first crankshaft is supported on the first carrier, and has a first eccentric body. The first external gear is fitted on the first eccentric body, and eccentrically rotates with rotation of the first crankshaft. The first internal gear meshes with the first external gear. The second carrier has a cylindrical cavity at its axis, and the first internal gear is formed on this cylindrical inner surface. Further, the second carrier supports the second crankshaft. The second external gear is fitted on the second eccentric body, and eccentrically rotates with rotation of the second crankshaft. The second internal gear meshes with the second external gear. The first carrier is engaged with the second input gear.

In the gear transmission taught in the present specification, the through-hole may be formed in the center of the second external gear, the first input gear may be fixed to the first crankshaft, and the first input gear may be disposed inside the through-hole of the second external gear. With this type of layout, the direction in which the first crankshaft extends from the first eccentric body (the direction in which the first input gear is positioned relative to the first eccentric body) is the opposite to the direction in which the second crankshaft extends from the second eccentric body. Further, the transmission of torque to the first input gear from an output gear of the motor can be performed within the through-hole of the second external gear.

In the gear transmission in which the first input gear is disposed inside the through-hole of the second external gear, the first carrier may be supported on the second carrier. In this case, a pair of bearings supporting the first carrier may be disposed, in an axial direction, between an input gear (second input gear) of the crankshaft of the second reduction unit and an eccentric body (second eccentric body) of the crankshaft (second crankshaft) of the second reduction unit, outward of the through-hole of the second external gear. The second carrier does not need to extend into the interior of the through-hole of the second external gear.

The techniques taught in the present specification are capable of making a gear transmission comprising two eccentric oscillating type reduction units more compact in size in the axial direction and the radial direction.

MODES FOR REALIZING THE INVENTION

Technical features of the embodiments will be described briefly below.

(Feature 1) An internal gear of a second reduction unit is formed on a cylindrical inner surface of a case of a gear transmission.

(Feature 2) A motor flange is fixed to the case of the gear transmission. A hole, through which a motor gear passes, is formed in the center of the motor flange.

(Feature 3) A crankshaft is supported on a carrier by a pair of bearings. An eccentric body is formed on the crankshaft. The eccentric body is disposed between the pair of bearings.

(Feature 4) A first reduction unit comprises a plurality of first crankshafts. A first input gear is fixed to each of the crankshafts. Motor torque is applied to all the first input gears (first embodiment).

(Feature 5) The first crankshaft of the first reduction unit is disposed coaxially with the gear transmission. The first crankshaft has a through-hole. An output shaft of the motor is fitted in the through-hole of the first crankshaft (second embodiment).

Embodiments

Figure 1:
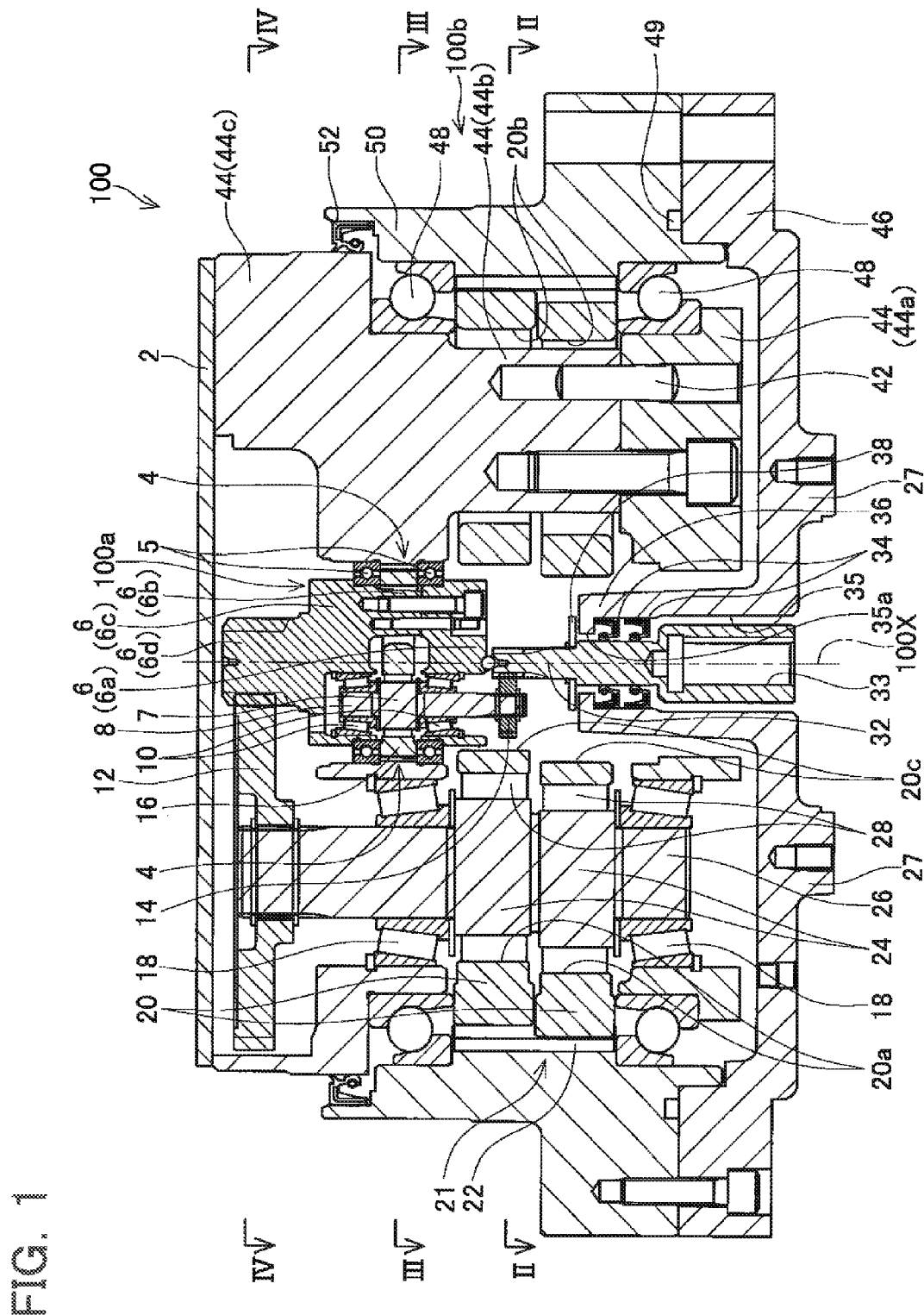
FIG. 1 shows a cross-sectional view of a gear transmission of a first embodiment.

A gear transmission 100 of the first embodiment will be described with reference to FIG. 1 to FIG. 4. FIG. 1 shows a cross-section of the gear transmission 100 taken along the axial direction. In order to clarify the drawing, hatching that represents a cross-section has been omitted for some components. Moreover, FIG. 1 corresponds to a cross-section along line I-I of FIG. 2 to FIG. 4. The gear transmission 100 comprises a first reduction unit 100a and a second reduction unit 100b. The reduction units 100a, 100b are an eccentric oscillating type, and are disposed coaxially. An axis 100x of the gear transmission 100 corresponds to an axis of the first reduction unit 100a and the second reduction unit 100b. Moreover, the axis 100x also corresponds to an axis of a first carrier 6, a second carrier 44 and a motor gear 32 (to be described).

The operation of the gear transmission 100 will be described briefly. In shape, the gear transmission 100 has a configuration in which the first reduction unit 100a and the second reduction unit 100b are connected in series. Details of the reduction units 100a, 100b will be described later. The torque of a motor (not shown) is supplied to a first crankshaft 8 of the first reduction unit 100a. The first reduction unit 100a amplifies the torque of the motor, and outputs the torque from the first carrier 6. The torque of the first carrier 6 is applied to a second crankshaft 26 of the second reduction unit 100b.

The second reduction unit 100b amplifies the torque applied to the second crankshaft 26, and outputs the torque from the second carrier 44. The second carrier 44 rotates relative to a case 50 of the gear transmission 100. The gear transmission 100 can output a large torque by using the two reduction units 100a, 100b. In other words, the gear transmission 100 can obtain a large reduction ratio by using the two reduction units 100a, 100b. Moreover, in the gear transmission 100, the case 50 is fixed to a base member (not shown). Consequently, the second carrier 44 corresponds to an output member of the gear transmission 100.

Next, the configuration of the second reduction unit 100b will be described. As shown in FIG. 1, the reduction unit 100b comprises a second internal gear 21, the second carrier 44, second external gears 20 and the second crankshaft 26. The second internal gear 21 is comprised of the case 50 of the gear transmission 100 and a plurality of inner pins 22 (see also FIG. 2). The second carrier 44 is supported on the case 50 by a pair of angular contact ball bearings 48. The second carrier 44 is comprised of a second output plate 44c and a second base plate 44a. A second columnar unit 44b extends from the second output plate 44c toward the second base plate 44a, and is fixed to the second base plate 44a. A tapered pin 42 is fitted into both the second output plate 44c and the second base plate 44a. The second output plate 44c and the second base plate 44a are prevented from rotating relative to each other by the tapered pin 42. The entirety of the second carrier 44 corresponds to an output member of the second reduction unit 100b.

The second crankshaft 26 is supported on the second carrier 44 by a pair of tapered roller bearings 18. The second crankshaft 26 has two eccentric bodies (second eccentric bodies) 24. A second input gear 12 is fixed to the second crankshaft 26. In the axial direction, the two eccentric bodies 24 are disposed between the pair of tapered roller bearings 18. Further, in the axial direction, the second input gear 12 is disposed outward of the pair of tapered roller bearings 18. The second external gears 20 are respectively fitted on the second eccentric bodies 24 via cylindrical roller bearings 28. The second carrier 44 supports the second crankshaft 26, and the second crankshaft 26 supports the second external gear 20. In other words, the second carrier 44 supports the second crankshaft 26 and the second external gears 20.

Figure 2:
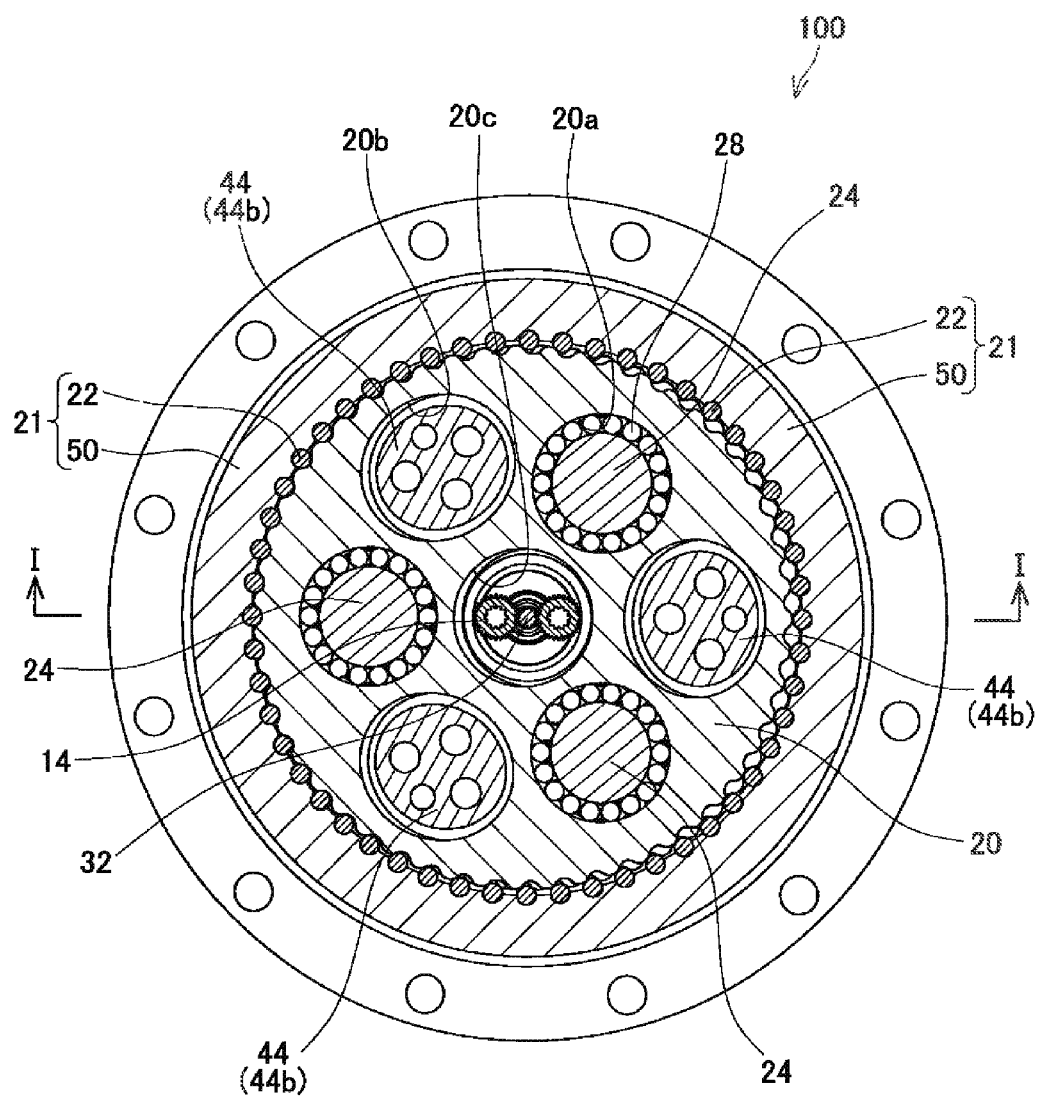
FIG. 2 shows a cross-sectional view along line II-II of FIG. 1.
Figure 4:
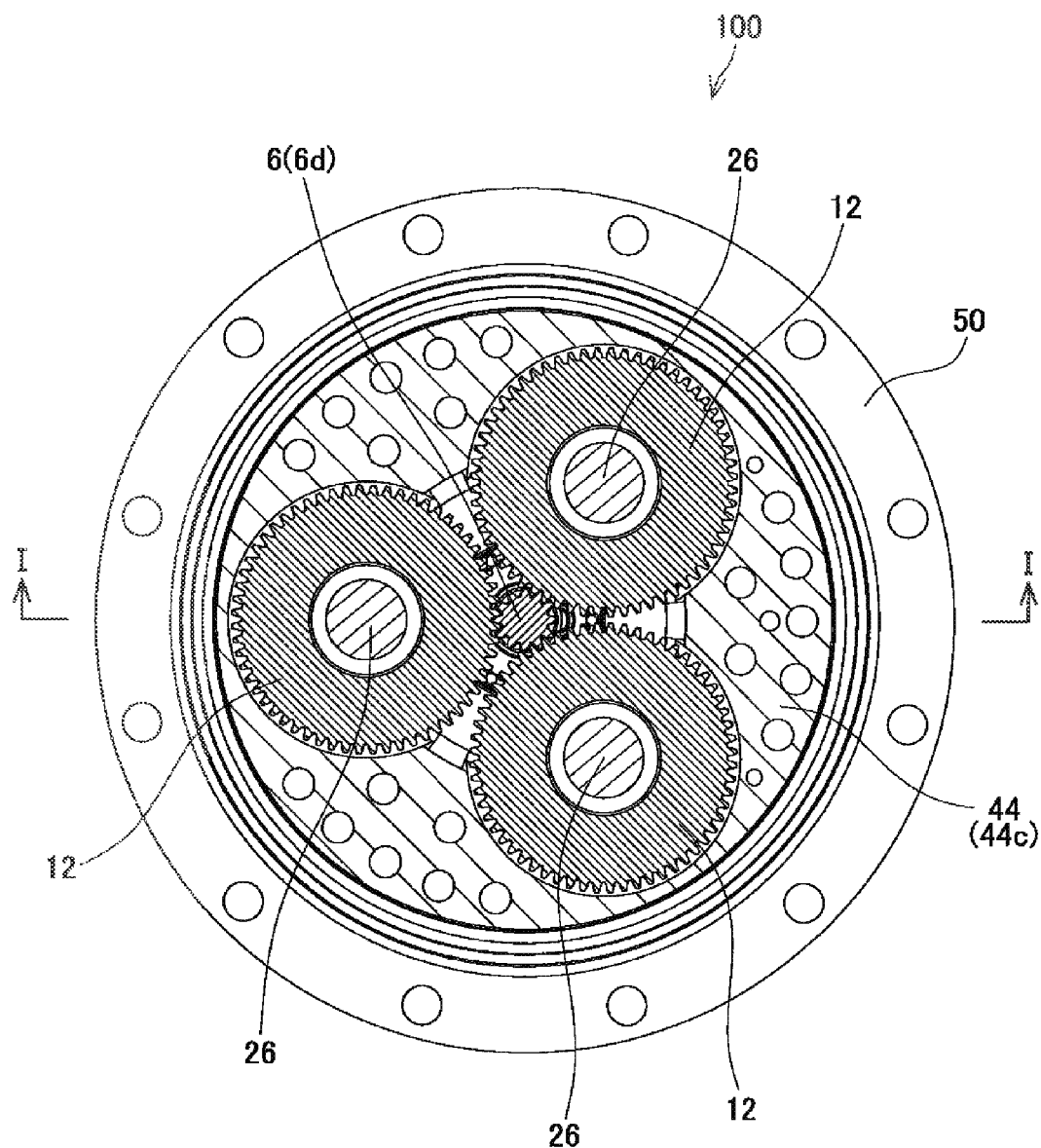
FIG. 4 shows a cross-sectional view along line IV-IV of FIG. 1.

As shown in FIG. 1 and FIG. 2, three first through-holes 20a and three second through-holes 20b are formed in a circumferential direction in the second external gear 20. Further, a third through-hole 20c is formed in the center of the second external gear 20. The first through-holes 20a and the second through-holes 20b are formed alternately along the circumferential direction of the second external gear 20. The second eccentric bodies 24 are respectively fitted in the first through-holes 20a. That is, the second reduction unit 100b comprises three second crankshafts 26. One second columnar unit 44b passes through each second through-hole 20b. In the second reduction unit 100b, the second crankshafts 26 and the second columnar units 44b are aligned alternately along the circumferential direction. Moreover, as shown in FIG. 4, the second input gears 12 are respectively fixed to the three second crankshafts 26. All of the second input gears 12 are meshed with an output gear 6d. The output gear 6d will be described later.

When the second crankshafts 26 rotate, the second eccentric bodies 24 rotate eccentrically around the axes of the second crankshafts 26. As the second eccentric bodies 24 rotate eccentrically, the second external gears 20 rotate eccentrically while meshing with the second internal gear 21. The number of the teeth of the second internal gear 21 (the number of inner pins 22) differs from the number of teeth of the second external gears 20. Consequently, when the second external gears 20 rotate eccentrically while meshing with the second internal gear 21, the second external gears 20 rotates relative to the second internal gear 21. As described above, the second external gears 20 are supported on the second carrier 44. Consequently, when the second external gears 20 rotate eccentrically, the carrier 44 rotates relative to the second internal gear 21 (the case 50).

In the second reduction unit 100b, the number of teeth of the second internal gear 21 (the number of inner pins 22) is fifty-two, and the number of teeth of the second external gears 20 is fifty-one. Consequently, the reduction ratio of the second reduction unit 100b is "1/53". Such a large reduction ratio is obtained by the second eccentric bodies 24 causing the second external gears 20 to rotate eccentrically, and by the second external gears 20 rotating eccentrically while meshing with the second internal gear 21. That is, the second eccentric bodies 24, the second external gears 20, and the second internal gear 21 correspond to main components of the second reduction unit 100b.

Next, the first reduction unit 100a will be described. The first reduction unit 100a is also an eccentric oscillating type, and its basic configuration is the same as that of the second reduction unit 100b. Consequently, structures that are common with the second reduction unit 100b will be briefly described. As shown in FIG. 1, the first reduction unit 100a comprises a first internal gear 4, the first carrier 6, a first external gear 16, and the first crankshaft 8. The second carrier 44 (the second output plate 44c) has a cylindrical space coaxial with the axis 100x. The first internal gear 4 is formed on a cylindrical inner surface of the second carrier 44. More specifically, the first internal gear 4 is comprised of a plurality of grooves formed in the cylindrical inner surface of the second output plate 44c, and inner teeth pins 45 inserted into the grooves (see FIG. 3).

The first carrier 6 is supported on the second carrier 44 by a pair of deep groove ball bearings 5. The second carrier 44 is equivalent to the case of the first reduction unit 100a. In other words, the second carrier 44 is integral with the case of the first reduction unit 100a. The first carrier 6 is comprised of a first output plate 6c and a first base plate 6a. A first columnar unit 6b extends from the first output plate 6c, and is fixed to the first base plate 6a. The output gear 6d is formed on the first output plate 6c. The output gear 6d corresponds to a part of the first carrier 6. The output gear 6d extends from the first output plate 6c in the opposite direction to the first columnar unit 6b. The output gear 6d meshes with the second input gear 12.

The first crankshaft 8 is supported on the first carrier 6 by a pair of tapered roller bearings 10. The first crankshaft 8 has one eccentric body (first eccentric body) 7. The first external gear 16 is fitted on the first eccentric body 7. The first external gear 16 meshes with the first internal gear 4. A first input gear 14 is fixed to the first crankshaft 8. The first input gear 14 is disposed, in the direction of the axis 100x, inside the third through-hole 20c of the second external gear 20. The first input gear 14 meshes with the motor gear 32 within the third through-hole 20c.

Figure 3:
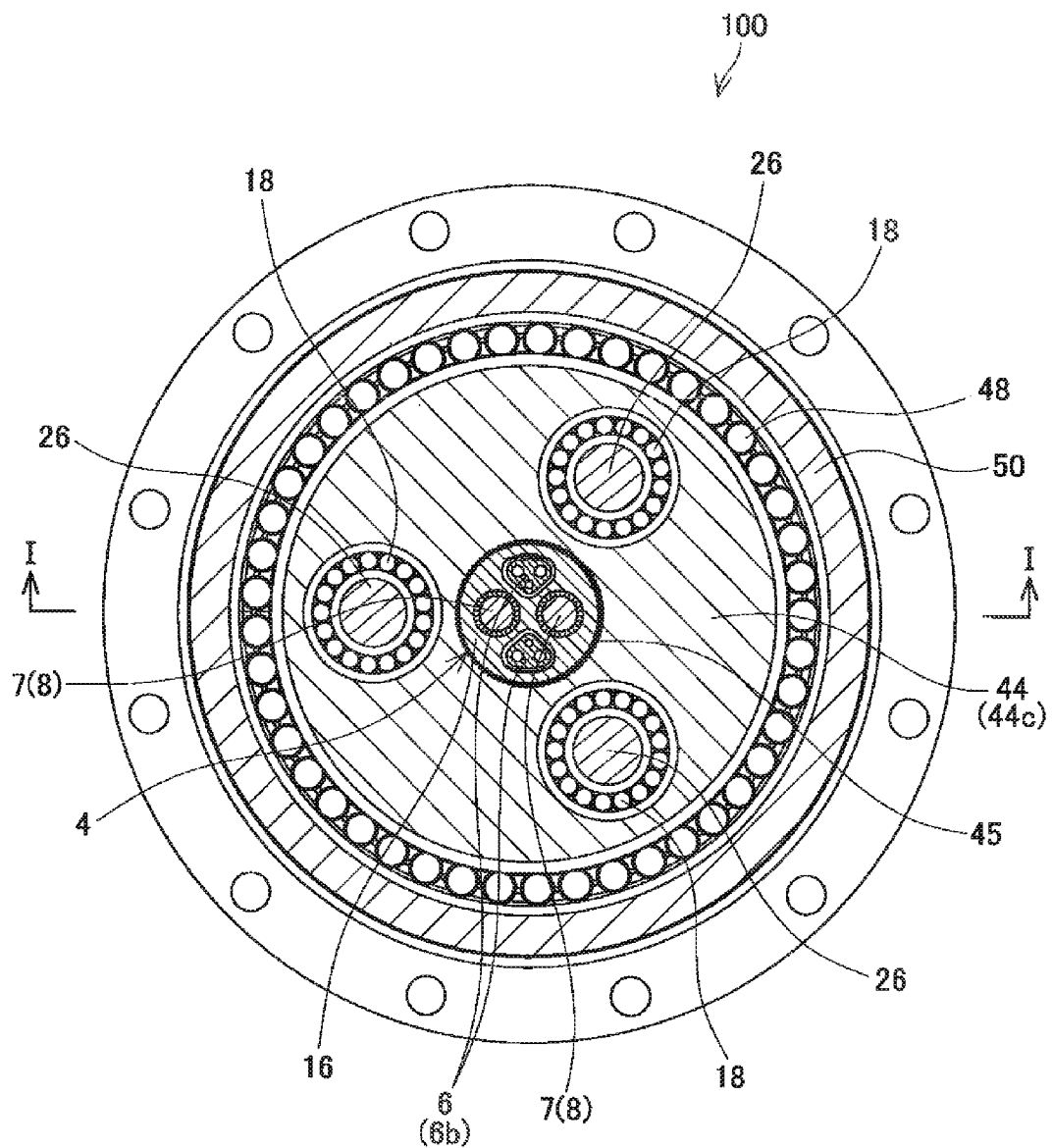
FIG. 3 shows a cross-sectional view along line III-III of FIG. 1.

As shown in FIGS. 2, 3, the first reduction unit 100a has two first crankshafts 8. The first input gears 14 are respectively fixed to the first crankshafts 8. Both the first input gears 14 mesh with the motor gear 32. The two first crankshafts 8 are disposed at symmetrical positions with respect to the axis 100x. Unlike FIGS. 2, 3, FIG. 1 shows the first reduction unit 100a in cross-section so as to illustrate the features of both the first crankshafts 8 and the first columnar units 6b. The operating principles of the first reduction unit 100a are essentially the same as those of the second reduction unit 100b, and consequently a description thereof is omitted. Moreover, in the first reduction unit 100a, the number of teeth of the first internal gear 4 (the number of the inner teeth pins 45) is eighty-two, and the number of teeth of the first external gear 16 is eighty-one. Consequently, the reduction ratio of the first reduction unit 100a is "1/83".

As shown in FIG. 1, the first internal gear 4 is disposed between the second input gear 12 and the second eccentric bodies 24. As described above, the first internal gear 4 meshes with the first external gear 16, and the first eccentric bodies 7 are fitted in the first external gear 16. Consequently, as shown in FIG. 3, the first internal gear 4, the first external gear 16 and the first eccentric bodies 7 are disposed on one plane orthogonal to the axis 100x. Consequently, the first external gear 16 or the first eccentric bodies 7 can also be expressed as being disposed between the second input gears 12 and the second eccentric bodies 24.

Moreover, the second internal gear 21, the second external gears 20, and the second eccentric bodies 24 are also disposed on one plane orthogonal to the axis 100x (see FIG. 2). Consequently, the first internal gear 4 (the first external gear 16, the first eccentric body 7) can also be expressed as being disposed between the second input gear 12 and the second internal gear 21. Or, the first internal gear 4 (the first external gear 16, the first eccentric body 7) can also be expressed as being disposed between the second input gears 12 and the second external gears 20. Further, in the direction of the axis 100x, a pair of deep groove ball bearings 5 is also disposed between the second input gears 12 and the second eccentric bodies 24. Consequently, the pair of deep groove ball bearings 5 is disposed outward of the third through-hole 20c.

As with the second reduction unit 100b, the first eccentric bodies 7, the first external gear 16 and the first internal gear 4 correspond to the main components of the first reduction unit 100a. In the gear transmission 100, the main components of the first reduction unit 100a are disposed between the second eccentric bodies 24 and the second input gears 12 in the direction of the axis 100x. Consequently, the overall length of the gear transmission 100 in the direction of the axis 100x can be made shorter than the sum of the length of the first reduction unit 100a and the length of the second reduction unit 100b. Moreover, in the gear transmission 100, the first reduction unit 100a is disposed, in the direction of the axis 100x, within the range of the length of the second reduction unit 100b in the axial direction. Consequently, the overall length of the gear transmission 100 in the axial direction is equal to the length of the second reduction unit 100b in the axial direction.

The first internal gear 4 of the first reduction unit 100a is formed on a cylindrical inner surface of the second carrier 44 of the second reduction unit 100b. In the radial direction of the gear transmission 100, the first reduction unit 100a is disposed within the range of the diameter of the second reduction unit 100b. Consequently, the diameter of the gear transmission 100 is identical to the diameter of the second reduction unit 100b. In the gear transmission 100, the entire first reduction unit 100a is housed within the second reduction unit 100b.

As described above, the first internal gear 4 is disposed between the second input gears 12 and the second eccentric bodies 24. In other words, in the direction of the axis 100x, the first internal gear 4 is disposed at a shaft portion of the second crankshaft 26. Consequently, the diameter of the first internal gear 4 is not affected by the size of the main components (the second eccentric bodies 24, the second external gears 20, the second internal gears 21) of the second reduction unit 100b. In case the first internal gear 4 and the second internal gear 21 are disposed on one plane orthogonal to the axis 100x, the diameter of the first internal gear 4 is restricted by the size of the main components of the second reduction unit 100b. Specifically, the diameter of the first internal gear must be smaller than the diameter of the third through-hole 20c. In this case, the first reduction unit 100a is small, and consequently the total reduction ratio of the gear transmission (the reduction ratio that is the sum of the first reduction unit 100a and the second reduction unit 100b) becomes smaller than the total reduction ratio of the gear transmission 100.

In case the first internal gear 4 and the second internal gear 21 are disposed on one plane orthogonal to the axis 100x without making the diameter of the first reduction unit smaller, the diameter of the third through-hole 20c is required to be greater than the diameter of the first internal gear 4. In this case, the distance, in the radial direction, from the axis 100x to the second crankshaft 26 increases. Consequently, the diameter of the second reduction unit 100b increases, and the diameter of the gear transmission 100 increases. By disposing the first internal gear 4 of the first reduction unit 100a between the second input gears 12 and the second eccentric bodies 24, an increase in size of the gear transmission in the axial and radial directions can be prevented.

Figure 5:
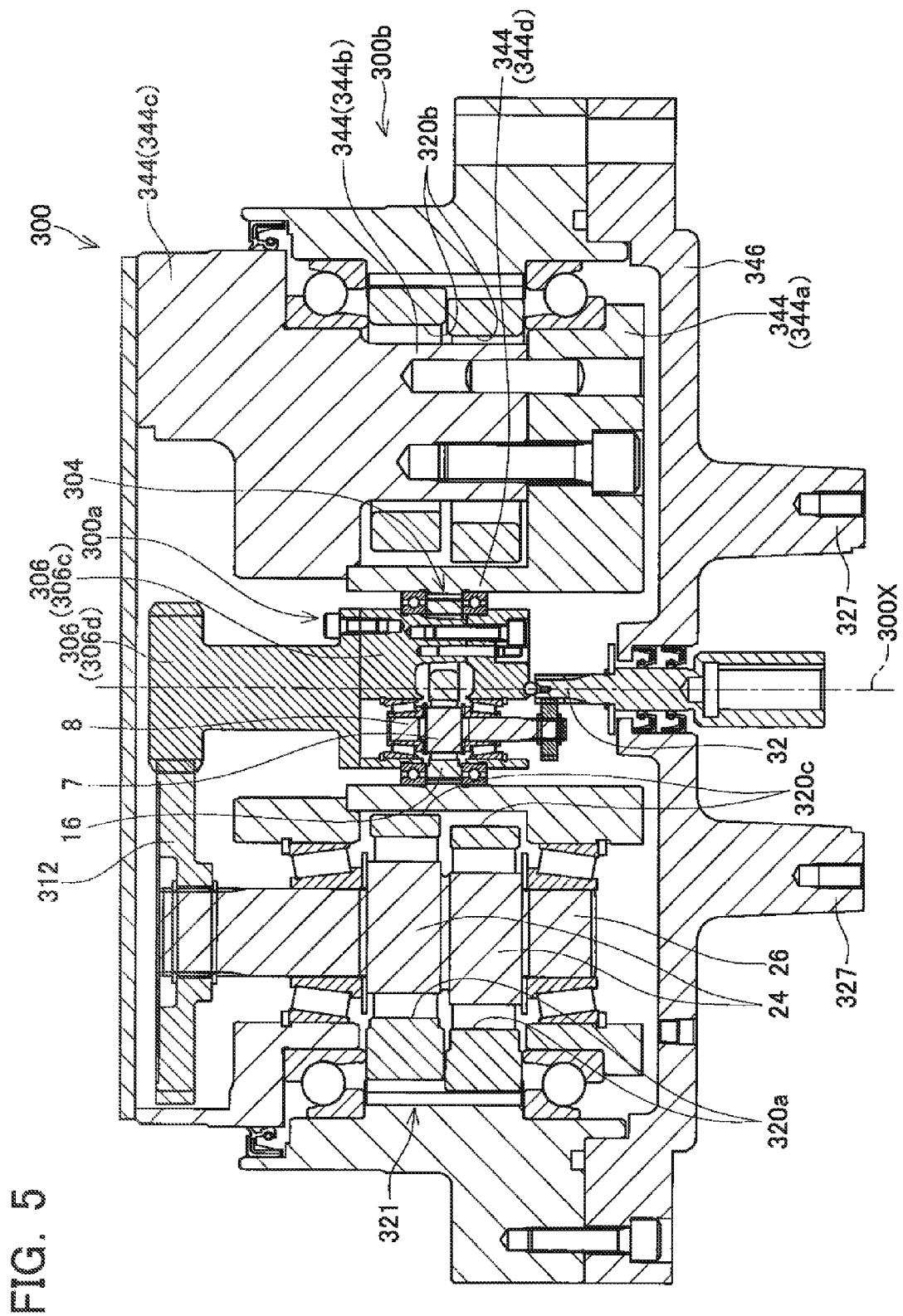
FIG. 5 shows a cross-sectional view of a gear transmission of a comparative example.

FIG. 5 shows a gear transmission 300 in which a first internal gear 304 and a second internal gear 321 are disposed on one plane orthogonal to an axis 300x. The diameter of a first reduction unit 300a of the gear transmission 300 of FIG. 5 is the same as the diameter of the first reduction unit 100a shown in FIG. 1. In the gear transmission 300, the first internal gear 304 is not disposed between a second input gear 312 and the second eccentric bodies 24. Moreover, in FIG. 5, reference numbers for components not requiring a description have been omitted.

In the gear transmission 300, a cylindrical unit 344d extends from a second base plate 344a toward a second output plate 344c. The cylindrical unit 344d passes through a third through-hole 320c. An internal gear 304 of the first reduction unit 300a is formed on a portion of an inner circumference of the cylindrical unit 344d. A first carrier 306 is supported on the cylindrical unit 344d (a second carrier 344) within the third through-hole 320c. The gear transmission 300 becomes longer only by the extent to which the first reduction unit 300a is disposed within the third through-hole 320c, i.e., the distance from an axis 300X to the crankshaft 26.

Figure 6:
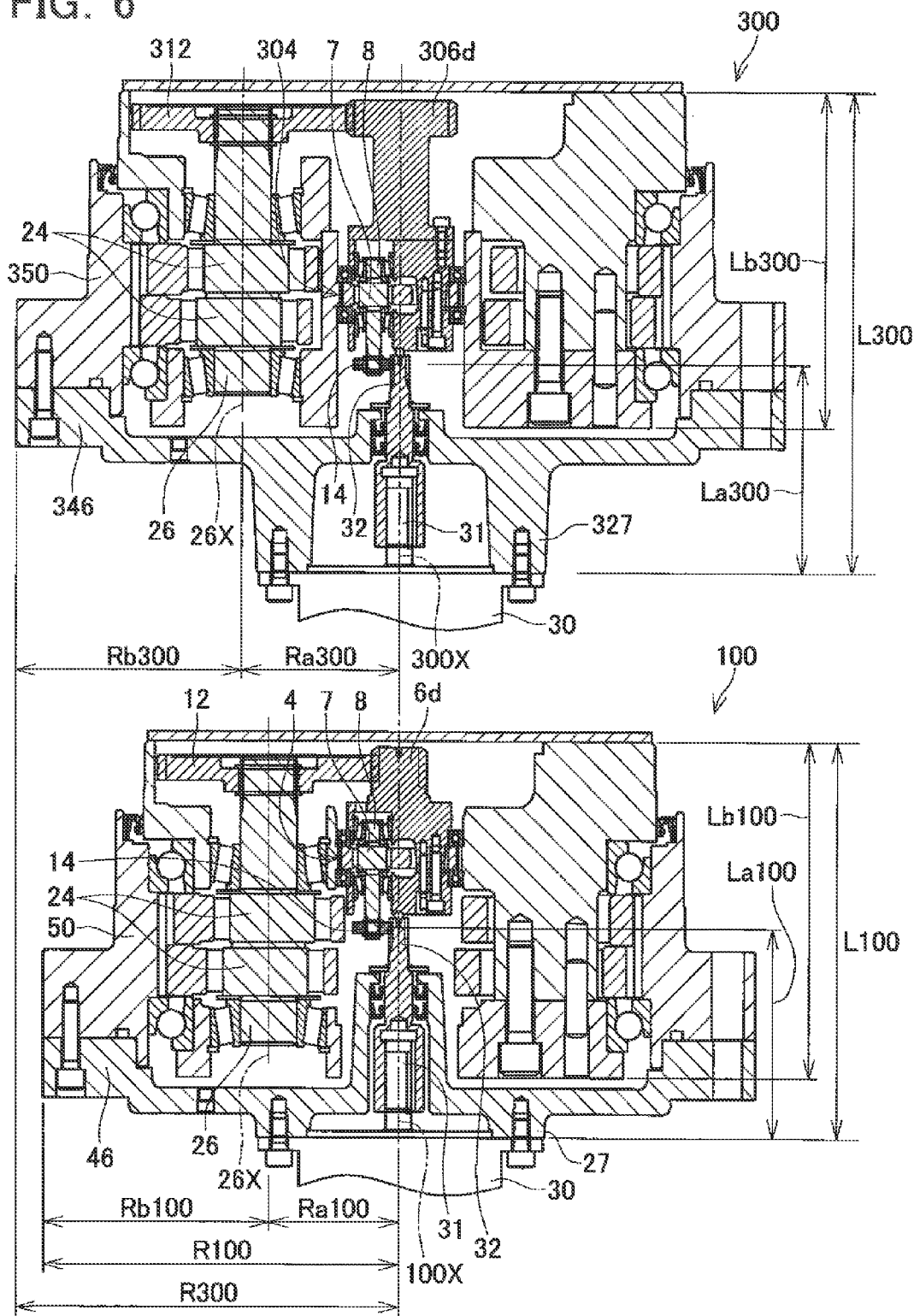
FIG. 6 is a figure for describing the difference in size between the gear transmission of the first embodiment and the gear transmission of the comparative example.

The difference in size of the gear transmission 100 and the gear transmission 300 will be compared with reference to FIG. 6. Moreover, in FIG. 6, diagrams are shown in which a motor 30 has been attached to each of the gear transmissions 100 and 300. An output shaft 31 of the motor 30 is key-joined in a hole 33 of a motor gear 36. In the gear transmission 100, the motor 30 is fixed to a motor fixing unit 27. In the gear transmission 300, the motor 30 is fixed to a motor fixing unit 327.

As shown in FIG. 6, the distance Ra300 from the axis 300X of the gear transmission 300 to the second crankshaft 26 is longer than the distance Ra100 from an axis 100X of the gear transmission 100 to the second crankshaft 26. The radius R300 of the gear transmission 300 is longer than the radius R100 of the gear transmission 100 by the above amount of difference. Moreover, the distance Rb300 from the second crankshaft 26 to an outer circumference of a case 350 is equal to the distance Rb100 from the second crankshaft 26 to an outer circumference of the case 50. By disposing the first internal gear 4 between the second input gear 12 and the second eccentric body 24, the diameter and the length in the axial direction of the gear transmission 100 is reduced.

As described above, the direction in which the first crankshafts 8 extend from the first eccentric bodies 7 is the opposite to the direction in which the second crankshafts 26 extend from the second eccentric bodies 24. In the gear transmission 100, the location at which the first input gears 14 and the motor gear 32 mesh is further toward the second input gear 12 side than in the gear transmission 300. Consequently, the distance La100 from the first input gears 14 of the gear transmission 100 to the motor 30 is shorter than the distance La300 from the first input gears 14 of the gear transmission 300 to the motor 30. Consequently, the length L100 in the axial direction of the gear transmission 100 including a motor flange 46 is shorter than the length L300 in the axial direction of the gear transmission 300 including a motor flange 346. Moreover, the length Lb100 in the axial direction of the gear transmission 100 excluding the motor flange 46 is identical to the length Lb300 in the axial direction of the gear transmission 300 excluding the motor flange 346.

Other features of the gear transmission 100 will be described. As described above, the first reduction unit 100a has the one first external gear 16, and the second reduction unit 100b has the two second external gears 20. In a case of an eccentric oscillating type gear transmission, the greater the number of external gears, the smaller the effect of eccentric rotation, thus improving the rotational balance of the gear transmission. On the other hand, the fewer the number of external gears, the lower the cost of the gear transmission. In a gear transmission in which a plurality of reduction units are connected in series, if the rotational balance of a reduction unit (the second reduction unit 100b) provided with an output member of the gear transmission is good, a good rotational balance of the entire gear transmission can be maintained even if the rotational balance of the other reduction units (the first reduction unit 100a) is somewhat poor. In the gear transmission 100, a good rotational balance of the entire gear transmission 100 can be maintained by having two of the second external gears 20 of the second reduction unit 100b. Further, the cost of the gear transmission 100 can be kept down by having one of the first external gear 16 of the first reduction unit 100a.

The first input gears 14 are respectively fixed to the first crankshafts 8, and the second input gears 12 are respectively fixed to the second crankshafts 26. In the gear transmission 100, the torque of the motor is amplified while being transmitted from the motor gear 32 to the first input gears 14. Further, the torque of the motor is also amplified while being transmitted from the output gear 6d to the second input gears 12. The torque of the motor is amplified by the main components (eccentric body, external gear and internal gear) of the first reduction unit 100a and the main components of the second reduction unit 100b. That is, in the gear transmission 100, the torque of the motor is amplified at four locations. In other words, the gear transmission 100 has four reduction portions.

As described above, the distance Ra100 from the axis 100X of the gear transmission 100 to the second crankshafts 26 is shorter than the distance Ra300 from the axis 300X of the gear transmission 300 to the second crankshafts 26. Consequently, the diameter of the output gear 6d of the gear transmission 100 can be made smaller than the diameter of an output gear 306d of the gear transmission 300. The reduction ratio between the output gear 6d and the second input gear 12 is greater than the reduction ratio between the output gear 306d and the second input gear 312. The gear transmission 100 can obtain a greater reduction ratio than the gear transmission 300.

In the gear transmission 100, the motor gear 32 and the first input gears 14 correspond to a first reduction portion, the main components of the first reduction unit 100a correspond to a second reduction portion, the output gear 6d and the second input gears 12 correspond to a third reduction portion, and the main components of the second reduction unit 100b correspond to a fourth reduction portion. In other words, the first reduction portion corresponds to an upstream reduction portion of the first reduction unit 100a, the second reduction portion corresponds to a downstream reduction portion of the first reduction unit 100a, the third reduction portion corresponds to an upstream reduction portion of the second reduction unit 100b, and the fourth reduction portion corresponds to a downstream reduction portion of the second reduction unit 100b.

The first eccentric bodies 7 are disposed between the first input gears 14 and the second input gears 12. In other words, in the direction of the axis 100x, the first input gears 14 are disposed on the opposite side from the second input gears 12 with respect to the first eccentric bodies 7. The first eccentric bodies 7 are respectively formed on the first crankshafts 8 between the pair of tapered roller bearings 10. The first input gears 14 are respectively fixed to the first crankshafts 8 outward of the pair of tapered roller bearings 10. Consequently, at least a distance for positioning one of the tapered roller bearings 10 is required between the first eccentric bodies 7 and the first input gears 14. In other words, the first crankshafts 8 must respectively extend from the first eccentric bodies 7 toward the first input gears 14.

In case the first input gears 14 and the second input gears 12 are arranged on the same side relative to the first eccentric bodies 7, the second crankshafts 26 must be extended further than necessary in order to avoid interference of the first input gears 14 and the second input gears 12. Consequently, the length of the second reduction unit 100b in the axial direction increases, and the overall length of the gear transmission 100 in the axial direction increases. Since the direction in which the first crankshafts 8 extends from the first eccentric bodies 7 is the opposite to the direction in which the second crankshafts 26 extend from the second eccentric bodies 24, the length of the first crankshafts 8 is not affected, and the length of the second crankshafts can be kept to the minimum.

Both the first internal gear 4 and the pair of deep groove ball bearings 5 are disposed between the second input gears 12 and the second eccentric bodies 24 in the direction of the axis 100x. Consequently, in the gear transmission 100, it is not necessary to extend the second carrier into the third through-hole 20c.

The motor flange 46 is fixed to the case 50. The motor 30 (see FIG. 6) is fixed to the motor flange 46. An oil seal 52 is disposed between the case 50 and the second carrier 44 (the second output plate 44c). A plate 2 is fixed to the second carrier 44 (the second output plate 44c) on the opposite side from the motor flange 46 in the direction of the axis 100x. A protrusion 36 is formed on a central portion of the motor flange 46. The protrusion 36 extends toward the plate 2. In other words, the central portion of the motor flange 46 protrudes into the interior of the second reduction unit 100b. A through-hole 35 is formed in the protrusion 36, and the motor gear 32 passes through the through-hole 35. A guard plate 38 is fixed to the motor gear 32. Two oil seals 34 are arranged between the protrusion 36 and the motor gear 32. Oil within the gear transmission 100 is prevented from leaking to the exterior of the gear transmission 100 by the oil seals 52, 34, the motor flange 46, and the plate 2. Moreover, an O-ring 49 is arranged between the case 50 and the motor flange 46. Consequently, the oil within the gear transmission 100 is prevented from leaking to the exterior of the gear transmission 100 from between the case 50 and the motor flange 46.

As described above, the protrusion 36 is formed on the central portion of the motor flange 46. Consequently, in case the motor flange 46 is used on the lower side in the vertical direction, it is difficult for foreign objects (wear particles of the gears, etc.) to permeate the oil seals 34. Further, since the guard plate 38 is fixed to the motor gear 32, it is even more difficult for foreign objects to permeate the oil seals 34. Moreover, the diameter of the guard plate 38 is greater than the diameter of an end portion 35a of the through-hole 35. Consequently, the motor gear 32 can be prevented from dropping when the output shaft of the motor is removed from the motor gear 32.

Figure 7:
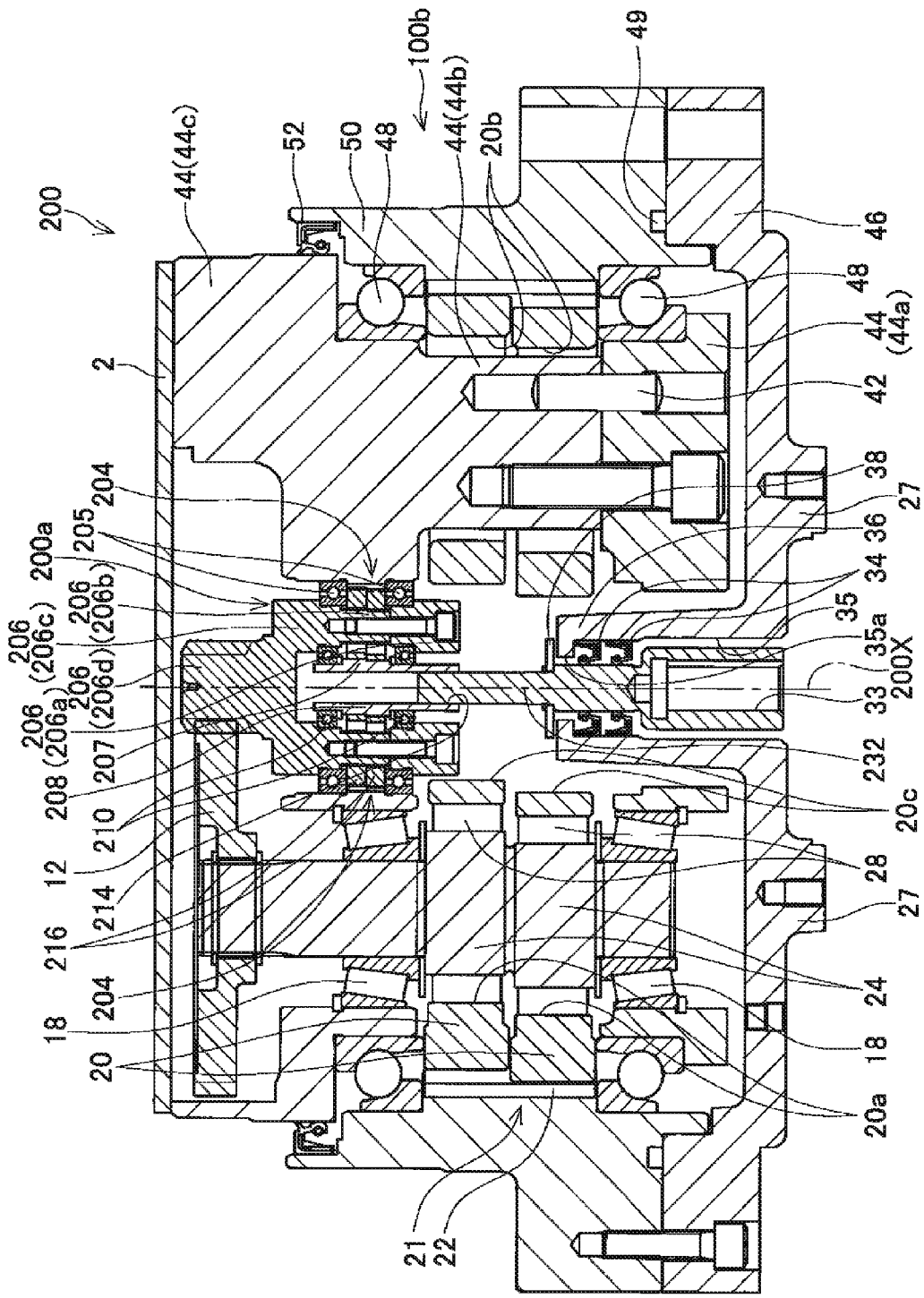
FIG. 7 shows a cross-sectional view of a gear transmission of a second embodiment.

A gear transmission 200 of a second embodiment will be described with reference to FIG. 7. The gear transmission 200 is a variant of the gear transmission 100. Specifically, the gear transmission 200 differs from the gear transmission 100 in the configuration of a first reduction unit 200a. Components of the gear transmission 200 that are essentially the same as the components of the gear transmission 100 have the same reference numbers or a number with the same last two digits, and a description thereof is omitted.

The first reduction unit 200a comprises a first crankshaft 208 coaxial with an axis 200x of the gear transmission 200. Whereas the gear transmission 100 has the two first crankshafts 8, the gear transmission 200 has the one first crankshaft 208. The first crankshaft 208 comprises two first eccentric bodies 207 that are aligned in the axial direction. First external gears 216 are respectively fitted on the first eccentric bodies 207. The eccentric rotation of the first eccentric bodies 207 deviates in direction from one another by 180°, and consequently the direction of eccentric rotation of the first external gears 216 also deviates by 180°. The two first external gears 216 rotate eccentrically while meshing with a first internal gear 204. Since the direction of eccentric rotation of the first external gears 216 is symmetric with respect to the axis 200x, the first reduction unit 200a has good rotational balance. The first crankshaft 208 has a through-hole 214, and a shaft 232 is fitted into the through-hole 214. Moreover, the output shaft of the motor is fitted in the hole 33 of the shaft 232. Consequently, the shaft 232 corresponds to the output shaft of the motor.

The first crankshaft 208 is supported on a carrier 206 by deep groove ball bearings 210. The carrier 206 is comprised of an output gear 206d, a first output plate 206c, a first columnar unit 206b, and a base plate 206a. The carrier 206 is supported on the second carrier 44 by deep groove ball bearings 205.

In the first and second embodiments, an example was described in which the carrier (the second carrier) of the second reduction unit also functions as the case of the first reduction unit. The case of the first reduction unit may be provided separately, and may be fixed to the cylindrical inner surface of the carrier of second reduction unit.

In the above embodiments, the description was given where the first and second reduction units are the type of reduction unit in which the external gear rotates eccentrically. The type of reduction unit in which the internal gear rotates eccentrically can also be adopted as the first reduction unit. The first reduction unit in this situation can be expressed as follows. The first reduction unit comprises a crankshaft having an eccentric body, a case supporting the crankshaft, and an external gear supported on the case and meshing with the internal gear. An input gear is fixed to the crankshaft, and motor torque is applied to the input gear. The internal gear is engaged with the eccentric body, and eccentrically rotates with rotation of the crankshaft. The first reduction unit amplifies the motor torque applied to the input gear, outputs the motor torque from the external gear, and applies the torque output from the external gear to an input gear of the second reduction unit.

In the present specification, the expression "the diameter of the reduction unit" was used. However, the techniques taught in the present specification are not intended to be limited to reduction units in which the outer shape is a perfect circle. For example, the outer shape or periphery of the reduction unit may be a rectangle or a polygon. It should be noted that the size of the reduction unit in the radial direction is defined by the diameter of the largest component of the main components.

Specific examples of the present invention are described above in detail, but these examples are merely illustrative and place no limitation on the scope of the patent claims. The technology described in the patent claims also encompasses various changes and modifications to the specific examples described above. The technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

The invention claimed is:

1. A gear transmission comprising:
   an eccentric-oscillating, first reduction gear unit, and
   an eccentric-oscillating, second reduction gear unit disposed coaxially with the first reduction gear unit and surrounding the first reduction gear unit,
   wherein an output member of the first reduction gear unit is engaged with a crankshaft of the second reduction gear unit,
   an input gear is connected to the crankshaft,
   an eccentric body is defined on the crankshaft and
   an internal gear of the first reduction gear unit is disposed, in an axial direction of the gear transmission, between the input gear and the eccentric body.

2. The gear transmission according to claim 1, wherein:
   the output member of the first reduction gear unit comprises a first carrier engaged with the input gear connected to the crankshaft of the second reduction gear unit.

3. The gear transmission according to claim 2, wherein the first reduction gear unit further comprises:
   a crankshaft supported on the first carrier and having a first eccentric body defined thereon and
   a first external gear fitted on the first eccentric body and meshed with the internal gear of the first reduction gear unit,
   wherein the first external gear is configured to eccentrically rotate when the crankshaft of the first reduction gear unit rotates.

4. The gear transmission according to claim 3, wherein the second reduction gear unit further comprises:
   a second carrier having an internal gear formed on a cylindrical inner surface thereof, the second carrier supporting the crankshaft of the second reduction gear unit; and
   a second external gear meshed with the internal gear of the second carrier and fitted on the eccentric body defined on the crankshaft of the second reduction gear unit,
   wherein the second external gear is configured to eccentrically rotate when the crankshaft of the second reduction gear unit rotates.

5. The gear transmission according to claim 4, wherein:
   a through-hole is formed in a center of the second external gear, and
   an input gear is fixed to the crankshaft of the first reduction gear unit and is disposed inside the through-hole.

6. The gear transmission according to claim 5, further comprising:
   a pair of bearings supporting the first carrier on the second carrier,
   wherein the pair of bearings is disposed, in the axial direction, between the input gear of the crankshaft of the second reduction gear unit and the eccentric body of the crankshaft of the second reduction gear unit.

7. The gear transmission according to claim 6, further comprising:
   a case that is integral with the second carrier, wherein the internal gear of the first reduction gear unit is defined on the case.

8. The gear transmission according to claim 7, further comprising:
   a motor flange fixed to the case,
   wherein a hole is defined in a center of the motor flange and is configured to receive a motor gear therethrough.

9. The gear transmission according to claim 8, wherein the first reduction gear unit comprises a plurality of crankshafts, each having an input gear fixed thereto and each being configured to have torque from the motor gear applied thereto.

10. The gear transmission according to claim 8, wherein a through-hole is defined in the crankshaft of the first reduction gear unit and an output shaft of a motor extends through the through-hole.

11. The gear transmission according to claim 8, wherein the second reduction gear unit has two external gears respectively fitted around two eccentric bodies defined on the crankshaft of the second reduction gear unit.

12. The gear transmission according to claim 8, wherein the second carrier does not extend into a through-hole defined in the center of the external gear of the second reduction gear unit.

13. The gear transmission according to claim 12, wherein:
    the motor flange has a central protrusion extending in the axial direction towards the first carrier,
    the hole is defined in the central protrusion,
    a motor is fixed to the motor flange and has the motor gear, which extends through the hole in the central protrusion,
    a guard plate is fixed to the motor gear, and
    at least one oil seal is sealingly disposed between an interior portion of the central protrusion and the motor gear.

14. The gear transmission according to claim 1, wherein the first reduction gear unit comprises a plurality of crankshafts, each having an input gear fixed thereto and each being configured to have torque from a motor applied thereto.

15. The gear transmission according to claim 1, wherein a through-hole is defined in a crankshaft of the first reduction gear unit and an output shaft of a motor extends through the through-hole.

16. The gear transmission according to claim 1, wherein the second reduction gear unit has two external gears respectively fitted around two eccentric bodies defined on the crankshaft of the second reduction gear unit.

17. The gear transmission according to claim 4, wherein the second carrier does not extend into a through-hole defined in the center of the external gear of the second reduction gear unit.

18. The gear transmission according to claim 7, further comprising:
    a motor flange fixed to the case and having a central protrusion extending in the axial direction towards the first carrier, a hole being defined in the central protrusion,
    a motor fixed to the motor flange and having a motor gear, which extends through the hole in the central protrusion,
    a guard plate fixed to the motor gear, and
    at least one oil seal sealingly disposed between an interior portion of the central protrusion and the motor gear.

19. A gear transmission comprising:
    an eccentric-oscillating first reduction gear unit having a first internal gear, a first crankshaft with at least one first eccentric body defined thereon, a first input gear fixed to the first crankshaft and a first output member, and
    an eccentric-oscillating second reduction gear unit disposed coaxially with the first reduction gear unit and surrounding the first reduction gear unit, the second reduction gear unit having a second internal gear, a second crankshaft with at least one second eccentric body defined thereon, a second input gear fixed to the second crankshaft and a second output member, wherein the first output member is engaged with the second input gear, and the first internal gear is disposed, in an axial direction of the gear transmission, between the second input gear and the at least one second eccentric body.

20. The gear transmission according to claim 19, wherein:

the first output member comprises a first carrier engaged with the second input gear, the first crankshaft is supported on the first carrier;

a first external gear is fitted on the at least one first eccentric body and meshes with the first internal gear of the first reduction gear unit, such that the first external gear eccentrically rotates when the first crankshaft rotates;

the second internal gear is defined on a second carrier formed on a cylindrical inner surface of a case, the second carrier supporting the second crankshaft;

a second external gear meshes with the second internal gear and is fitted on the at least one second eccentric body such that the second external gear eccentrically rotates when the second crankshaft rotates.

* * * * *